United States Patent
Ludtke

(10) Patent No.: US 6,377,276 B1
(45) Date of Patent: Apr. 23, 2002

(54) BITMAP ANIMATION OF ON-SCREEN-DISPLAY GRAPHICS OVER A DISTRIBUTED NETWORK AND A CLIPPING REGION HAVING A VISIBLE WINDOW

(75) Inventor: Harold Aaron Ludtke, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/251,316

(22) Filed: Feb. 17, 1999

Related U.S. Application Data

(60) Provisional application No. 60/089,798, filed on Jun. 18, 1998.

(51) Int. Cl.$^7$ .......................... G06T 15/30; G06T 13/00
(52) U.S. Cl. ....................................... 345/620; 345/473
(58) Field of Search ................................ 345/434, 118, 345/473, 121, 620, 622, 628

(56) References Cited

U.S. PATENT DOCUMENTS

| | | | |
|---|---|---|---|
| 4,641,255 A | * 2/1987 | Hohmann | 345/628 |
| 4,800,376 A | 1/1989 | Suga et al. | 340/721 |
| 5,003,496 A | * 3/1991 | Hunt, Jr. et al. | 345/430 |

(List continued on next page.)

FOREIGN PATENT DOCUMENTS

| | | | |
|---|---|---|---|
| EP | 0476533 A2 | 3/1992 | |
| EP | 0658010 A1 | 6/1995 | H04B/1/20 |
| EP | 0835029 A2 | 4/1998 | H04N/7/24 |
| EP | 0840512 A2 | 5/1998 | H04N/7/24 |
| WO | WO 97/49057 A2 | 12/1997 | |

OTHER PUBLICATIONS

Patent Abstracts of Japan Publications No. 05094162.
A. J. Kunzman et al., "1394 High Performance Serial Bus: The Digital Interface for ATV," IEEE Transactions on Consumer Electronics, vol. 41, no. 3, Aug. 1995, pp. 893–900, USA.
IEEE, "1394–1995 Standard for a High Performance Serial Bus," 1995, USA.
Sony et al., "The HAVi Architecture: Specification of the Home Audio/Video Interoperability (HAVi) Architecture" Draft Version 0.8n13, Sep. 16, 1998.
IEC, "61883–1998 Standard for Digital Interface for Consumer Audio/Video Equipment," Parts 1–5, Edition 1.0, Feb. 1998.

*Primary Examiner*—Jeffery Brier
*Assistant Examiner*—Ryan Yang
(74) *Attorney, Agent, or Firm*—Haverstock & Owens LLP

(57) ABSTRACT

A method of and apparatus for bitmap animation and display of on-screen-display graphics utilizes the HAVi architecture and displays the bitmap animation using a clipping region and a visible window. Data for a bitmap image of on-screen-display graphics is generated by a graphics source within a source device. The data is transmitted to a display device including a rendering engine. The bitmap image is then rendered by the display device. A clipping region and visible window are applied to the bitmap image as it is displayed by the display device. Only the portion of the bitmap image corresponding to the logical intersection of the visible window and the clipping region is displayed by the display device. The clipping region, visible window and the bitmap image can be moved in relation to each other through an animation sequence. The bitmap image can also be changed to generate animation within the clipping region. The size, position, path and other attributes of the clipping region are set within a bitmap animation object structure. Data for an object can also be generated by the source device and transmitted to the display device. The object can be moved through an animation sequence when displayed by the display device. Images or animation sequences can be displayed on or in the object.

9 Claims, 6 Drawing Sheets

U.S. PATENT DOCUMENTS

| | | | |
|---|---|---|---|
| 5,179,370 A | * 1/1993 | Sato | 345/628 |
| 5,255,360 A | * 10/1993 | Peaslee et al. | 345/523 |
| 5,313,227 A | * 5/1994 | Aoki et al. | 345/626 |
| 5,343,250 A | 8/1994 | Iwamura | 348/564 |
| 5,473,740 A | * 12/1995 | Kasson | 345/628 |
| 5,537,521 A | * 7/1996 | Bibayan | 345/626 |
| 5,581,796 A | * 12/1996 | Koga et al. | 346/433 |
| 5,642,498 A | 6/1997 | Kutner | 395/509 |
| 5,682,249 A | 10/1997 | Harrington et al. | 358/433 |
| 5,708,527 A | 1/1998 | Adamson et al. | 359/451 |
| 5,729,704 A | * 3/1998 | Stone et al. | 345/346 |
| 5,764,277 A | 6/1998 | Loui et al. | 348/14 |
| 5,778,054 A | 7/1998 | Kimura et al. | 379/93.23 |
| 5,880,739 A | * 3/1999 | Collins | 345/433 |
| 5,880,741 A | * 3/1999 | Takeuchi | 345/626 |
| 5,883,634 A | * 3/1999 | Narayanaswami | 345/434 |
| 5,926,153 A | 7/1999 | Ohishi et al. | 345/1 |
| 5,966,136 A | * 10/1999 | Kurtz et al. | 345/434 |
| 5,983,190 A | * 11/1999 | Trower, II et al. | 704/276 |
| 5,986,622 A | 11/1999 | Ong | 345/1 |
| 6,002,401 A | * 12/1999 | Baker | 345/349 |
| 6,003,065 A | * 12/1999 | Yan et al. | 709/201 |
| 6,005,574 A | * 12/1999 | Herrod | 345/344 |
| 6,069,606 A | 5/2000 | Sciammarella et al. | 345/127 |
| 6,084,553 A | 7/2000 | Walls et al. | 345/1 |
| 6,121,981 A | * 9/2000 | Trower, II et al. | 345/437 |
| 6,208,319 B1 | 3/2001 | Nishida | 345/1 |

* cited by examiner

BITMAP ANIMATION OF ON-SCREEN-DISPLAY GRAPHICS OVER A DISTRIBUTED NETWORK AND A CLIPPING REGION HAVING A VISIBLE WINDOW

RELATED APPLICATIONS

This application claims priority under 35 U.S.C. § 119(e) of the co-pending U.S. provisional application Ser. No. 60/089,798 filed on Jun. 18, 1998 and entitled "A METHOD FOR HANDLING HIGH BANDWIDTH ON-SCREEN-DISPLAY (OSD) OVER A DISTRIBUTED 1394 NETWORK." The provisional application Ser. No. 60/089,798 filed on Jun. 18, 1998 and entitled "A METHOD FOR HANDLING HIGH BANDWIDTH ON-SCREEN-DISPLAY (OSD) OVER A DISTRIBUTED 1394 NETWORK" is also hereby incorporated by reference.

FIELD OF THE INVENTION

The present invention relates to the field of displaying on-screen-display graphics data on a display device. More particularly, the present invention relates to the field of displaying bitmap animation of on-screen-display graphics data on a display device.

BACKGROUND OF THE INVENTION

The IEEE 1394–1995 standard, "1394 Standard For A High Performance Serial Bus," is an international standard for implementing an inexpensive high-speed serial bus architecture which supports both asynchronous and isochronous format data transfers. In addition, the IEEE 1394–1995 bus has a universal clock called the cycle timer. This clock is synchronized on all nodes. Isochronous data transfers are real-time transfers which take place based on the universal clock such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394–1995 standard bus architecture provides multiple independent channels for isochronous data transfer between applications. A six bit channel number is broadcast with the data to ensure reception by the appropriate application. This allows multiple applications to simultaneously transmit isochronous data across the bus structure. Asynchronous transfers are traditional reliable data transfer operations which take place as soon as arbitration is won and transfer a maximum amount of data from a source to a destination.

The IEEE 1394–1995 standard provides a high-speed serial bus for interconnecting digital devices thereby providing a universal I/O connection. The IEEE 1394–1995 standard defines a digital interface for the application thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394–1995 standard is very thin in size compared to other bulkier cables used to connect such devices in other connection schemes. Devices can be added and removed from an IEEE 1394–1995 bus while the bus is operational. If a device is so added or removed the bus will then automatically reconfigure itself for transmitting data between the then existing nodes. A node is considered a logical entity with a unique address on the bus structure. Each node provides in a standard address space, an identification ROM, a standardized set of control registers and in addition, its own address space.

The IEEE 1394–1995 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device and the IEEE 1394–1995 cable. The physical layer 16 also provides arbitration to ensure that all devices coupled to the IEEE 1394–1995 bus have arbitrated access to the bus as well as actual data transmission and reception. The link layer 14 provides data packet delivery service for both asynchronous and isochronous data packet transport. This supports both asynchronous data transport, using an acknowledgement protocol, and isochronous data transport, providing an un-acknowledged real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

A home audio/video interoperability (HAVi) architecture is defined by "The HAVi Architecture: Specification of the Home Audio/Video Interoperability (HAVi) Architecture," draft version 0.8n13, Sep. 16, 1998. The HAVi architecture is to be implemented on consumer electronics devices and computing devices. The HAVi architecture provides a set of services which facilitate interoperability and the development of distributed applications on home networks. The HAVi architecture is designed for digital devices coupled together within an IEEE 1394–1995 serial bus network.

The HAVi architecture defines two on-screen-display graphics models, referred to as level 1 and level 2. The level 1 on-screen-display graphics model is a descriptive model in which the target device provides, through a series of commands from the control device, data structures which describe the intended on-screen-display graphics. Using a graphics library applications programming interface, the display device uploads this information and constructs the display graphics, which may or may not look as the target device intended. The level 2 on-screen-display graphics model defines a runtime execution environment, where the display device uploads executable code which runs on the display device itself. This executable code is then used to generate the on-screen-display graphics using facilities provided by the display device. Using the HAVi architecture, a source device such as a digital VCR can generate data which is transmitted to the display device and utilized by the display device to generate the on-screen-display graphics.

SUMMARY OF THE INVENTION

A method of and apparatus for bitmap animation and display of on-screen-display graphics utilizes the HAVi architecture and displays the bitmap animation using a clipping region and a visible window. Data for a bitmap image of on-screen-display graphics is generated by a graphics source within a source device. The data is transmitted to a display device including a rendering engine. The bitmap image is then rendered by the display device. A clipping region and visible window are applied to the bitmap image as it is displayed by the display device. Only the portion of the bitmap image corresponding to the logical intersection of the visible window and the clipping region is displayed by the display device. The clipping region, visible window and the bitmap image can be moved in relation to each other through an animation sequence. The bitmap image can also be changed to generate animation within the clipping region. The size, position, path and other attributes of the clipping region are set within a bitmap animation object structure. Data for an object can also be generated by the source device and transmitted to the display device. The object can be moved through an animation sequence when displayed by the display device. Images or animation sequences can be displayed on or in the object.

In one aspect of the present invention, a display through which a rendered image is displayed includes a visible window applied to a first portion of the rendered image and a clipping region through which only a second portion of the rendered image is visible. The clipping region can be moved in relation to the rendered image. The rendered image can be moved in relation to the clipping region. A source device is configured to generate data related to the rendered image, the clipping region and the visible window. The display still further includes a rendering engine coupled to the source device to render the rendered image and apply the clipping region and the visible window. The displayed image is preferably a bitmap image. The rendering engine is preferably coupled to the source device by a high speed serial interface. The data is preferably generated according to HAVi architecture. Alternatively, the data is generated according to the AV/C panel subunit. Preferably, the high speed serial interface is an IEEE 1394 serial bus.

In another aspect of the present invention, a method of generating on-screen-display graphics on a display device includes the steps of generating on-screen-display graphics data at a source device relating to a bitmap image, clipping region and visible window, transmitting the on-screen-display graphics data to the display device, rendering the bitmap image at the display device, applying the clipping region and the visible window to the bitmap image and displaying only a first portion of the bitmap image corresponding to an intersection of the visible window and the clipping region. A second portion of the bitmap a image outside of the intersection of the visible window and the clipping region is masked. The method further includes the step of generating an animation effect by moving the clipping region in relation to the bitmap image. The method also includes the step of generating an animation effect by moving the bitmap image in relation to the clipping region. The method also includes the step of storing the bitmap image at the display device. The source device is preferably coupled to the display device by a high speed serial interface. Preferably, the high speed serial interface is an IEEE 1394 serial bus. The on-screen-display graphics data is generated according to HAVi architecture. Alternatively, the on-screen-display graphics data is generated according to the AV/C panel subunit.

In yet another aspect of the present invention, a method of generating an object on a display device includes the steps of generating on-screen-display graphics data at a source device relating to the object, transmitting the on-screen-display graphics data to the display device, rendering the object at the display device, displaying the object at the display device and generating an animation effect by moving the object along a path prescribed by the on-screen-display graphics data. The method further includes the step of displaying one or more images on the object. The source device is preferably coupled to the display device by a high speed serial interface. Preferably, the high speed serial interface is an IEEE 1394 serial bus. The on-screen-display graphics data is preferably generated according to HAVi architecture. Alternatively, the on-screen-display graphics data is generated according to the AV/C panel subunit.

In still another aspect of the present invention, a system for generating and displaying images includes a source device having a graphics source for generating on-screen-display graphics data relating to a bitmap image, clipping region and visible window and a source interface circuit coupled to the graphics source for transmitting the on-screen-display graphics data and a display device having a display interface circuit coupled to the source interface circuit for receiving the on-screen-display graphics data, a rendering engine coupled to the display interface circuit for receiving the on-screen-display graphics data, rendering the bitmap image and applying the clipping region and the visible window to the bitmap image and a display coupled to the rendering engine for displaying only a first portion of the bitmap image corresponding to an intersection of the visible window and the clipping region. A second portion of the bitmap image outside of the intersection of the visible window and the clipping region is masked. The bitmap image can be moved in relation to the clipping region. The clipping region can be moved in relation to the bitmap image. The display interface circuit is preferably coupled to the source interface circuit by a high speed serial interface. Preferably, the high speed serial interface is an IEEE 1394 serial bus. The on-screen-display graphics data is preferably generated according to HAVi architecture. Alternatively, the on-screen-display graphics data is generated according to the AV/C panel subunit. The system further includes a memory buffer coupled to the rendering engine for storing the bitmap image.

DETAILED DESCRIPTION OF THE PREFERRED EMBODIMENT

A clipping region and a visible window are used to display bitmap animation preferably generated utilizing the HAVi architecture. Data for a bitmap image of on-screen-display graphics is generated by a graphics source within a source device. The data is transmitted to a display device including a rendering engine. The bitmap image is then rendered by the display device and stored within a local graphics buffer. The clipping region and visible window are applied to the bitmap image as it is displayed by the display device. Only the portion of the bitmap image corresponding to the logical intersection of the visible window and the clipping region is displayed by the display device. The visible window, clipping region and the bitmap image can be moved in relation to each other through an animation sequence. The bitmap image can also be changed to generate animation within the clipping region. The size, position, path and other attributes of the visible window and clipping region are set within a bitmap animation object structure.

Data for an object can also be generated by the source device and transmitted to the display device. The object can be moved through an animation sequence when displayed by the display device. Images or animation sequences can be displayed on or in the object.

Figure 1:
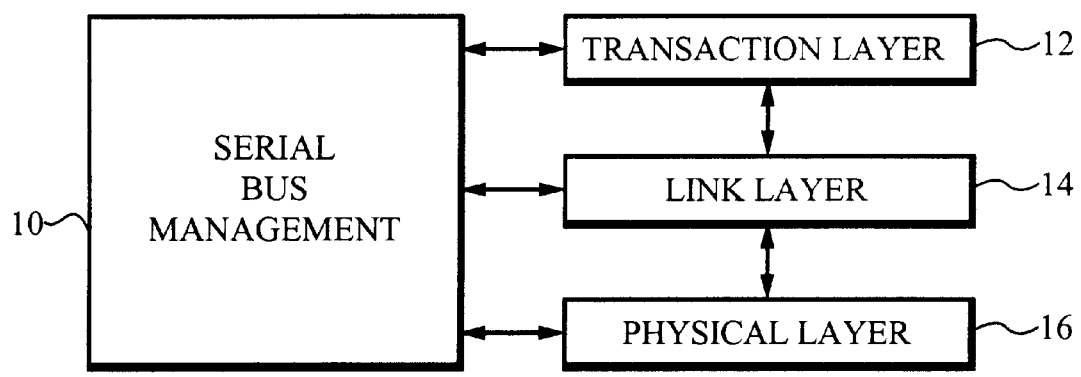
FIG. 1 illustrates a protocol defined by the IEEE 1394–1995 standard.
Figure 2:
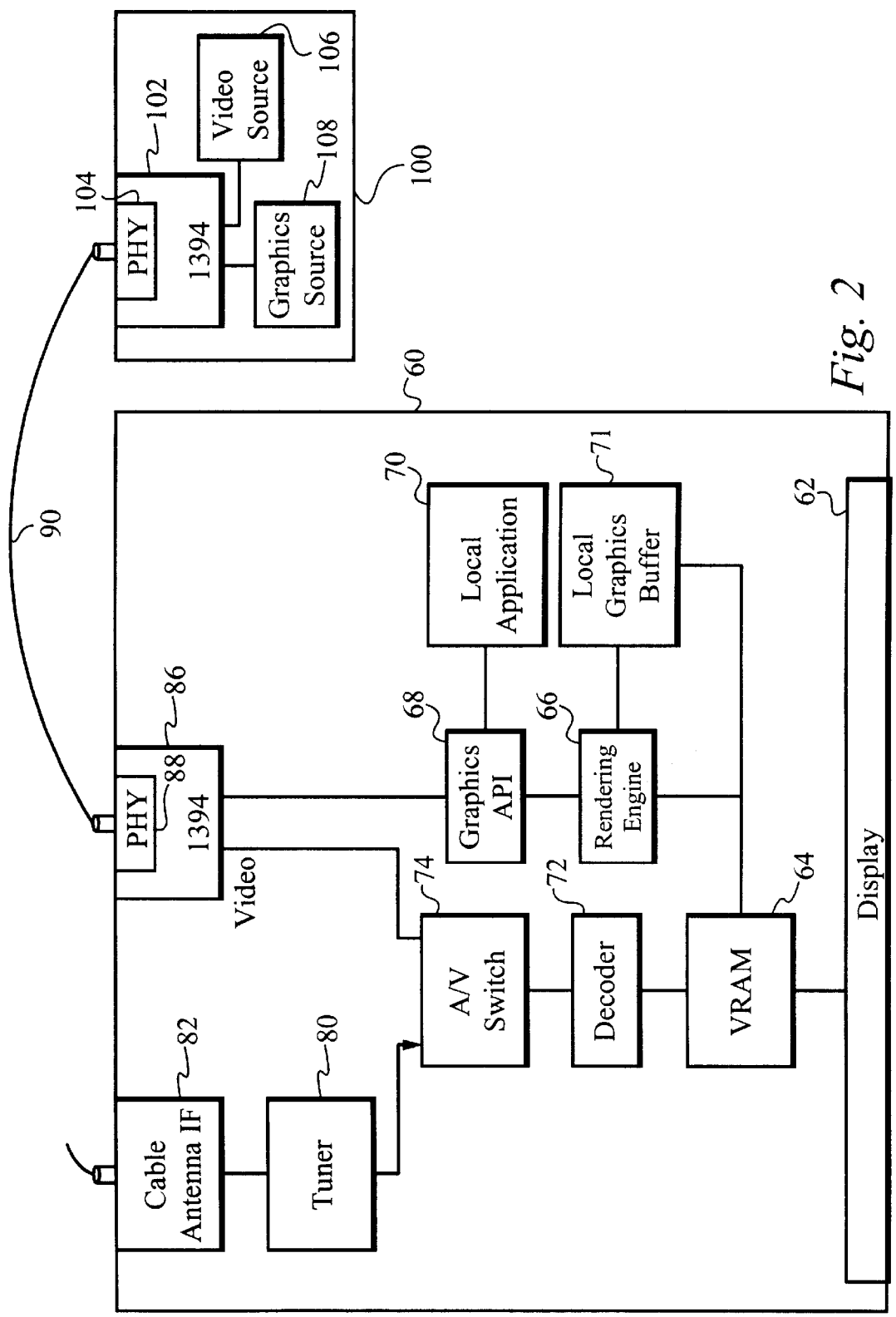
FIG. 2 illustrates a block diagram of an exemplary network of devices according to the present invention, including a television and a VCR.

A block diagram of an exemplary network of devices including a television 60 and a VCR 100 connected together by an IEEE 1394–1995 cable 90 is illustrated in FIG. 2. Relevant components of the television 60 and the VCR 100 are also illustrated in FIG. 2.

The television 60 includes an IEEE 1394–1995 interface circuit 86 through which data and commands are sent to and received from the VCR 100. The IEEE 1394–1995 interface circuit 86 includes a physical interface circuit 88. The physical interface circuit 88 is coupled to the VCR 100 by the IEEE 1394–1995 serial bus cable 90. The IEEE 1394–1995 interface circuit 86 is coupled to an audio/video switch 74 for providing video data from the VCR 100. The IEEE 1394–1995 interface circuit 86 is also coupled to a graphics applications programming interface 68 for receiving data representing on-screen-display graphics to be generated and displayed by the television 60. The television 60 also includes one or more local applications 70 which are coupled to a graphics applications programming interface 68 for receiving data representing on-screen-display graphics to be generated and displayed by the television 60. The graphics applications programming interface 68 is coupled to a rendering engine 66 which receives the data and generates appropriate on-screen-display graphics from the data. The rendering engine 66 is coupled to a local graphics buffer 71 for storing bitmap images generated according to the present invention and displayed through a visible window. The rendering engine 66 and the local graphics buffer 71 are also coupled to the VRAM circuit 64 to provide the generated on-screen-display graphics to the VRAM circuit 64.

The television 60 also includes a cable/antenna interface circuit 82 which is coupled to receive input signals from a coaxial cable or an antenna and to pass those signals through a tuner 80 to the audio/video switch 74. The audio/video switch 74 is coupled to a decoding circuit 72 for decoding any encoded video signals and providing the decoded video signals to the VRAM circuit 64. The VRAM circuit 64 is coupled to the display 62 for providing the video signals to the display 62.

The VCR 100 includes an IEEE 1394–1995 interface circuit 102 through which data and commands are sent to and received from the television 60. The IEEE 1394–1995 interface circuit 102 includes a physical interface circuit 104. The physical interface circuit 104 is coupled to the television 60, over the IEEE 1394–1995 serial bus cable 90.

The VCR 100 includes a video source 106, such as a video tape, which is being played by the VCR 100, or a television input. The video source 106 is coupled to the IEEE 1394–1995 interface circuit 102 for transmitting video streams of data over the IEEE 1394–1995 serial bus cable 90 to the television 60. The VCR 100 also includes a graphics source 108 which generates data, preferably in the HAVi architecture, related to on-screen-display graphics to be displayed by the television 60. The graphics source 108 is coupled to the IEEE 1394–1995 interface circuit 102 for transmitting the graphics data over the IEEE 1394–1995 serial bus cable 90 to the television 60.

The configuration illustrated in FIG. 2 is exemplary only. It should be apparent that an audio/video network could include many different combinations of components. It should be recognized that data, commands and parameters can be sent in either direction between the devices within the IEEE 1394–1995 network, as appropriate.

Utilizing the present invention, the VCR 100 transmits graphics data generated by the graphics source and related to on-screen-display graphics to be displayed by the television 60. Preferably, the graphics data is generated according to the HAVi architecture. The on-screen-display graphics data is generated by the graphics source 108 and preferably transmitted to the television 60 over the IEEE 1394–1995 serial bus cable 90.

Figure 3:
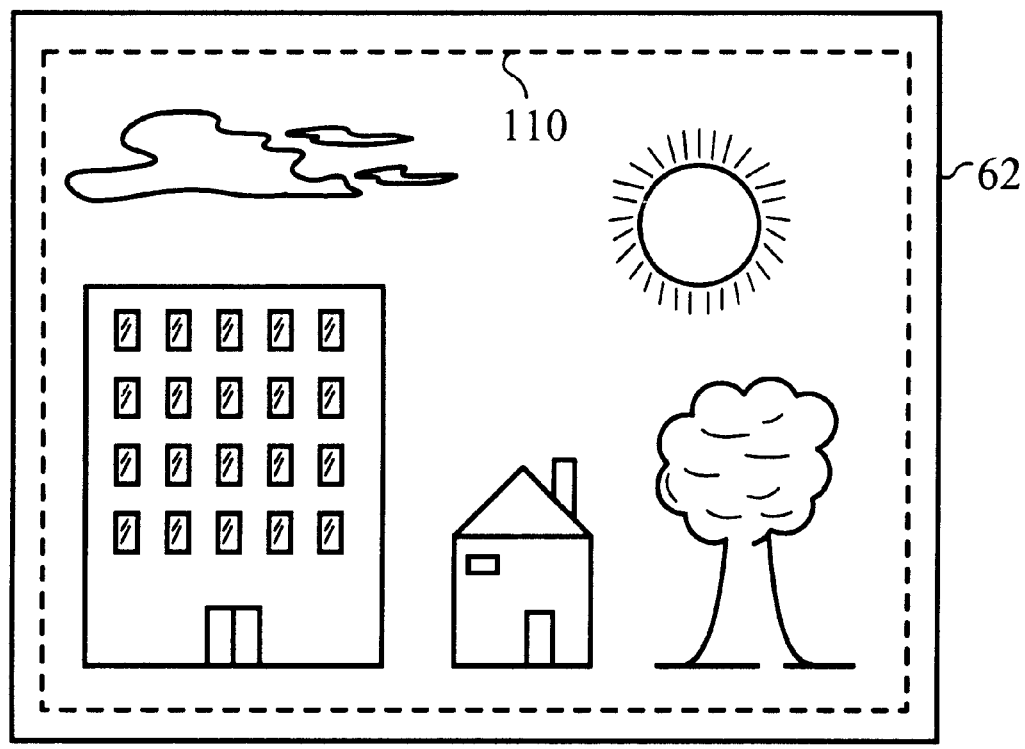
FIG. 3 illustrates a bitmap image of on-screen-display graphics displayed on the display 62.

When received by the television 60, the on-screen-display graphics data is received by the interface circuit 86 and transmitted to the graphics applications programming interface 68. The graphics applications programming interface 68, in conjunction with the rendering engine 66, generates the on-screen-display graphics specified in the data received from the VCR 100. When generated, the on-screen-display graphics are then preferably loaded into the local graphics buffer 71. From the local graphics buffer 71, the on-screen-display graphics are either transmitted to the VRAM circuit 64 as full images or a clipping region and visible window are applied to the images and only a portion of the image is transferred to the VRAM circuit 64, as will be described in detail below. In either event, from the local graphics buffer 71, the bitmap images to be displayed are then loaded in the VRAM circuit 64 to be displayed by the display 62. An example of an entire bitmap image of on-screen-display graphics data displayed on the display 62, generated by the rendering engine 66 from data received from the VCR 100 is illustrated in FIG. 3. This graphics scene 110 was generated by the rendering engine 66 from data received from the VCR 100. The rendering engine 66 generates the graphics scene 110 and loads it into the VRAM 64 to be shown on the display 62 at the appropriate time.

Figure 4:
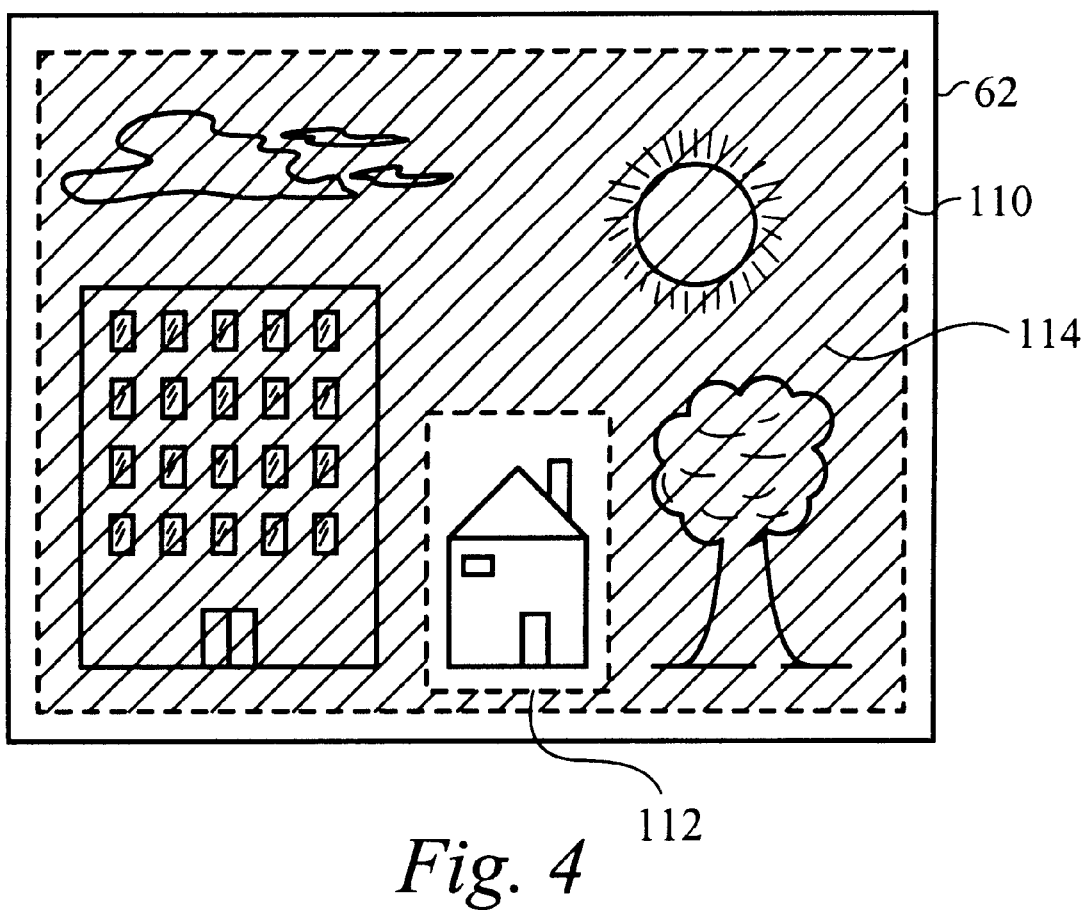
FIG. 4 illustrates a bitmap image of on-screen-display graphics displayed using a clipping region and visible window according to the present invention.

When on-screen-display graphics data is sent from the VCR 100 to a display device according to the present invention, the on-screen-display graphics data is rendered and displayed after applying a clipping region and a visible window, as illustrated in FIG. 4. The visible window preferably corresponds to a size of the display on the display device and includes the portion of the on-screen-display graphics data which fits into the size of the visible window. Alternatively, the visible window can be sized to correspond to any appropriate portion of the display and includes the portion of the on-screen-display graphics data which fits into the size of the visible window. If the on-screen-display graphics data is larger than the size of the visible window, the visible window is applied to the graphics scene to capture the portion of the graphics scene corresponding to the visible window. The graphics scene can be repositioned in relation to the visible window so that different portions of the graphics scene are positioned within the visible window. The graphics scene can also be scaled to fit within the visible window.

Within the graphics scene 110, only the portion within the logical intersection of the clipping region 112 and the visible window 114 is visible to the user. In this example, because the entire clipping region 112 is positioned within the visible window 114, the portion of the graphics scene 110 corresponding to the position of the clipping region 112 is visible to the viewer. The remainder of the graphics scene 110, outside of the clipping region 112, is masked from view by the user. Within the portion of the display 62 outside of the logical intersection between the clipping region 112 and the visible window 114, another video stream can be displayed, another on-screen-display graphics scene can be displayed or nothing at all can be displayed, depending on the specific configuration and desired animation effect.

Figure 5:
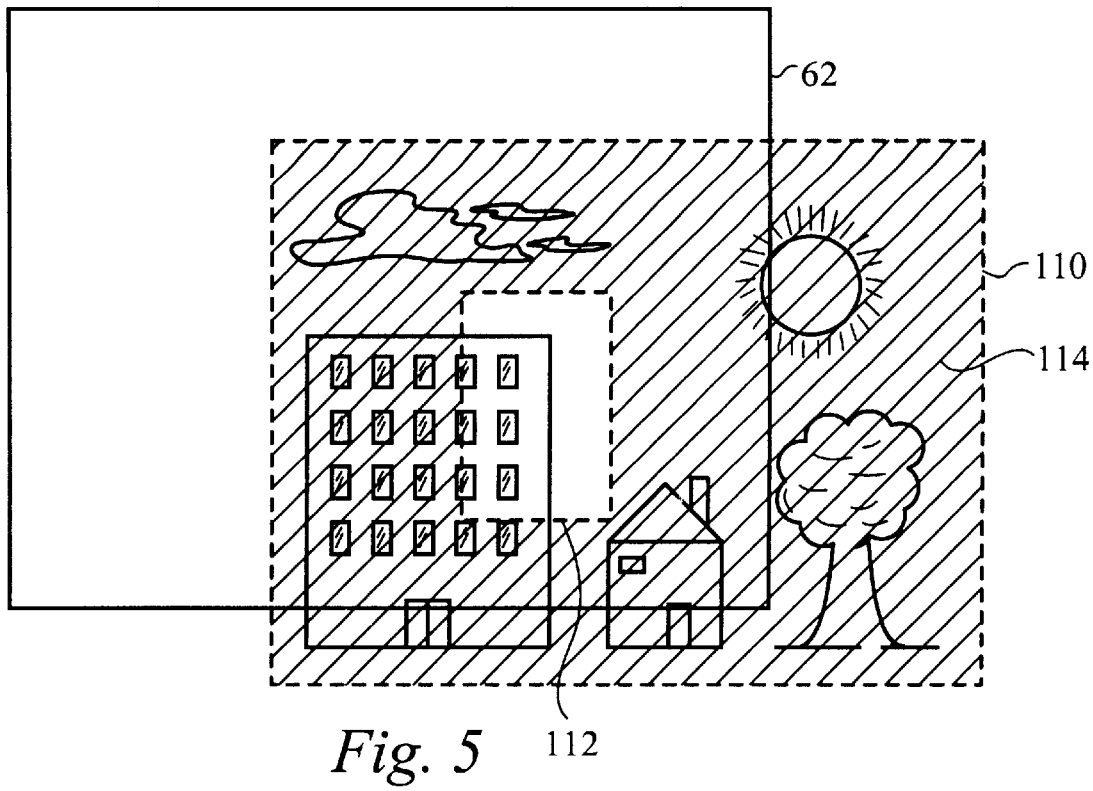
FIG. 5 illustrates a bitmap image of on-screen-display graphics displayed wherein the bitmap image is shifted in relation to the visible window and clipping region.
Figure 6:
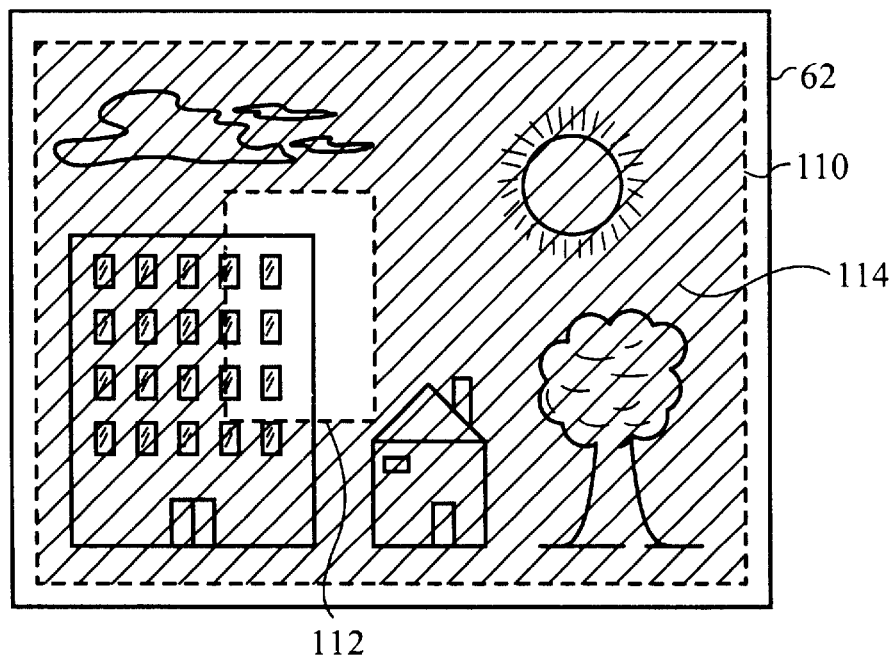
FIG. 6 illustrates a bitmap image of on-screen-display graphics displayed wherein the clipping region is shifted in relation to the bitmap image.

The size, shape and orientation of the clipping region 112 can be changed, preferably by the user entering commands into the television 60 or VCR 100 through an appropriate input device. Also, the position of the clipping region 112 can be changed in relation to the graphics scene 110 and the visible window 114 to allow the user to view other portions of the graphics scene 110 and to generate an animation effect of scrolling. The visible window 114 and the graphics scene 110 can be re-oriented in relation to the clipping region 112 to allow a user to see a different portion of the graphics scene 110 through the intersection of the clipping region 112 and the visible window 114, as illustrated in FIG. 5. In this figure, the graphics scene 110 is shown with a portion outside of the display 62 only to illustrate the operation of the present invention. The position of the clipping region 112 can also be changed in relation to the graphics scene 110 and the visible window 114 to allow a user to see a different portion of the graphics scene 110, as illustrated in FIG. 6.

By moving either the clipping region 112 in relation to the graphics scene 110 and the visible window 114, or the graphics scene 110 and the visible window 114 in relation to the clipping region 112, a scrolling window animation feature is generated for on-screen-display graphics. As discussed above, the graphics scene 110 can also be moved in relation to the visible window 114 in order to generate changing graphics within the visible window 114. It should also be understood that a series of bitmap images can be displayed using the clipping region and visible window of the present invention to generate an animated video stream within the clipping region 112.

The graphics scene 110, the visible window 114 and the clipping region 112 are formed within a bitmap animation object structure. The preferred structure of the bitmap animation object in interface definition language (IDL) code is listed below:

```
Struct          BitmapAnimation {
    Bitmap          imageData;
    Region          visibleWindow;
    Position        deltaImagePosition;
    Position        deltaClipPosition;
    Position        deltaWindowPosition;
    Region          clipRegion;
    unsigned short duration;
    Boolean         animating;
        other attributes
        .
        .
        .
}
```

This bitmap animation object structure includes the data for the bitmap image or graphics scene and its size. The bitmap animation object structure also includes the attributes of the clipping region 112 and the visible window 114, defining the size and shape of the area which acts as a mask over the bitmap image. Preferably, the area inside the defined clipping region refers to some portion of the visible window 114 and is visible to the user. The portion of the bitmap image outside of the intersection of the visible window 114 and the defined clipping region 112 is not visible to the user. The bitmap animation object structure also includes an animation direction composed of different or delta values for x and y directions. When the animation direction is triggered, the bitmap image is preferably shifted in the direction specified by the x and y delta values. Alternatively, when the animation direction is triggered, the clip region is shifted in the direction specified by the x and y delta values. The bitmap animation object structure additionally includes a duration value, over which the animation is to take place. The duration value is a time value, preferably in increments of 0.1 seconds. Once the animating or shifting begins, it takes an amount of time specified by the duration value to reach the position specified by the animation direction x and y delta values. The bitmap animation object structure further includes an animating status value which indicates whether or not the animating or shifting is currently taking place. The animating status value also acts as a trigger to start and stop the animating process. Alternatively, specific commands are sent to start and stop the animating process. The other attributes field within the bitmap animation object structure includes application specific values, specified by the HAVi architecture, such as selectable, repetition, position, focus sound, font, focus navigation and relation.

Using the architectural rules defined by the HAVi architecture, the display device 60 extracts the on-screen-display graphics data from the source device 100. A bitmap image graphics scene 110 is then rendered by the display device 60. The on-screen-display graphics displayed to the user on the display 62 are generated by first generating the entire bitmap image 110, saving it into the local graphics buffer 71, then applying the clipping region 112 and the visible window 114 to the bitmap image 110. This results in only the portion of the graphics scene 110 within the logical intersection of the visible window 114 and the clipping region 112 being visible to the user.

The value of the animating status value within the initial bitmap animation object structure indicates whether an animating or shifting sequence is to begin immediately when the bitmap image is displayed or at some later time. If the animating sequence is not to begin immediately, then some trigger event will cause the animating state to change. The trigger event is an event causing a change in the animating state, such as a user selecting the animating feature or the source device 100 specifying that the animating state should change. When a triggering event occurs, the source device 100 preferably notifies the display device 60 according to the procedure specified within the HAVi architecture. In this notification message, the bitmap animation object structure is included with the changed animating status value. The notification message sent after a trigger event, can include changed values relating to the bitmap image, clip region, delta position, duration, animation state and any other specified attributes.

If the display device receives a notification message with a changed bitmap animation object structure, then the display device examines the bitmap animation object structure to determine what value or values have been changed. If the animating status value is changed, the display device 60 then starts, stops or changes the animation sequence as specified by the animating status value. If the animating status value is changed to a start value and the delta x and y values are changed to equal "50" and "−10," respectively, the display device 60 shifts the bitmap image 110 in relation to the clipping region 112, as specified by the delta x and y values. Preferably, the delta x and y values specify change in position by a change of a specified number of pixels. A positive value for a delta x or y value, indicates a change to the right or up, respectively. A negative value for a delta x or y value, indicates a change to the left or down, respectively. In this example, a delta x value of "50" specifies a change of 50 pixels in the horizontal direction to the right of the position of the bitmap image 110. A delta y value of "−10" specifies a change of 10 pixels of the position of the bitmap image 110 in the down vertical direction. Such a change is illustrated in the relative position of the bitmap image of FIG. 5, in relation to the position of the bitmap image of FIG. 4.

Alternatively, a changed animated status value and delta x and y values relate to a change of the position of the clipping region 112 on the display 62 and in relation to the bitmap image 110 and the visible window 114. This creates a visual effect of animating the clipping region 112 in relation to the bitmap image 110. Rather than an image scrolling through the clipping region 112, the clipping region 112 is moving around on the display 62 and in relation to the bitmap image 110 and the visible window 114, with the viewable portions of the bitmap image 110 changing with the movement of the clipping region 112.

On-screen-display graphics data for the entire bitmap image are preferably sent from the source device 100 to the display device 60. The display device 60 then renders the appropriate on-screen-display graphics for the specified bitmap image. The animating or shifting of the bitmap image in relation to the visible window 112 is managed, by the rendering engine 66, using the local graphics buffer 71. This allows smooth animation of a bitmap image 110 and a clipping region 112, on the display 62. Having the display device 60 render the on-screen-display graphics and manage the animation also allows a much simpler source device 110 which does not have to calculate the delta pixels of a shifting bitmap image and communicate them to the display device 60.

The bitmap animation sequence of the present invention also allows a visible object, such as an icon or bitmap image, to move around on the display, if appropriate. The preferred structure of this object animation in IDL code is listed below:

```
Struct      ObjectAnimation         {
    Bitmap          imageData;
    Sequence        <Position>      trajectory;
    unsigned short  duration;
    Boolean         animating;
    Position        currentPosition;
        other attributes
            .
            .
            .
}
```

Within this object animation structure, the sequence <Position> field defines an arbitrary collection of position data structures, relating to vertexes of a path along which the object is animated. Preferably, this path is defined by straight lines between positions on the screen. Alternatively, the path can be defined by a combination of straight lines, curves or arcs, which allow more complex motions.

Figure 7:
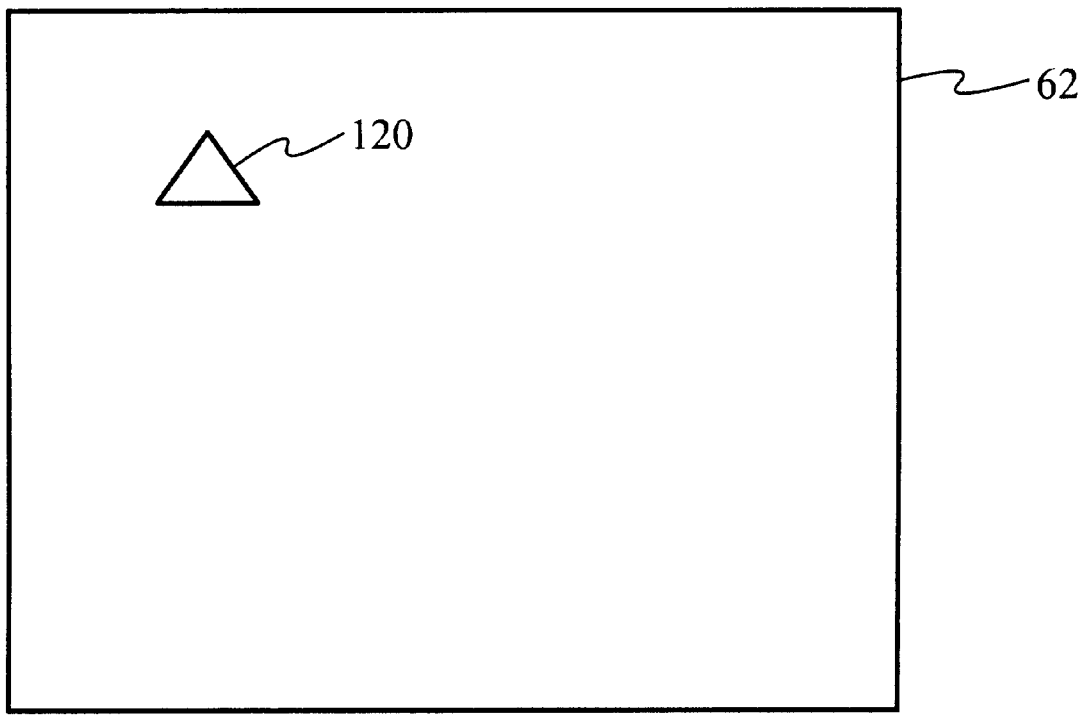
FIG. 7 illustrates an animation object according to the present invention, displayed on the display 62.
Figure 8:
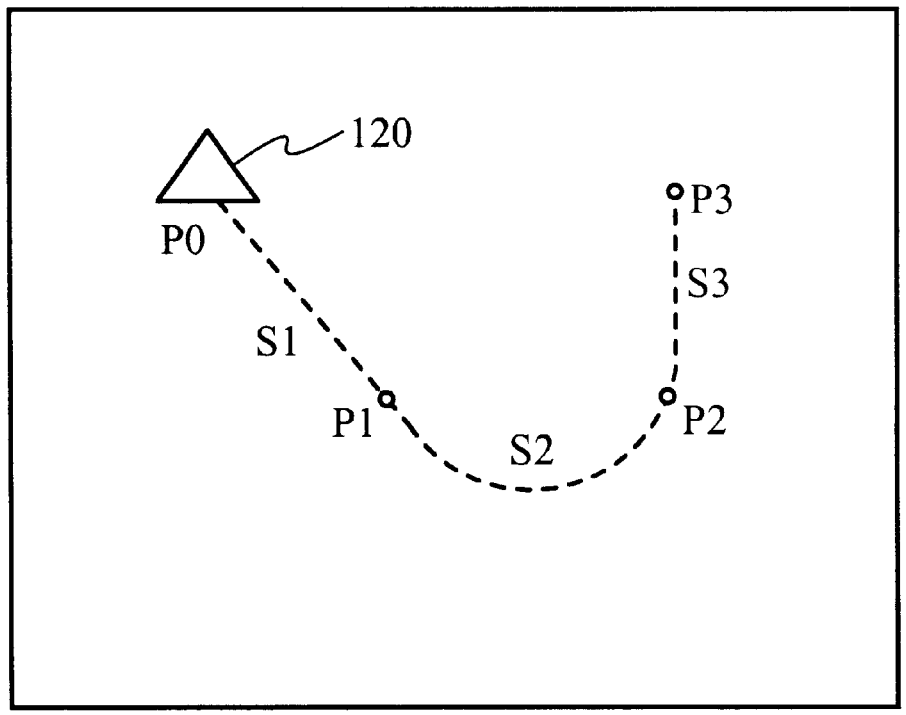
FIG. 8 illustrates a prescribed path along which the animation object is moved.

The setup procedure for displaying an object structure is similar to that described above for a bitmap image. The display device 60 first extracts the on-screen-display graphics data for the object from the source device 100. The object 120 is then rendered by the display device 60, on the display 62, as illustrated in FIG. 7. If an animating sequence is then triggered, the object 120 is appropriately moved around the display 62. When the animation sequence is triggered, the display device 60 shifts the object on the display 62 according to the prescribed path and position data structures. Such a path is illustrated in FIG. 8. Each of the legs of the path has an associated speed value S to allow the appearance of the object 120 speeding up and slowing down along the path. The object 120 is first positioned at the start position P0. From the start position P0, the object 120 is moved along a straight line to the position P1, at the speed S1. From the position P1, the object 120 is then moved along a curve to the position P2, at the speed S2. From the position P2, the object 120 is then moved along a straight line to the final position P3, at the speed S3.

In an alternate embodiment, the object 120 is animated as it is travelling along the path, allowing a series of bitmap images to be shown within or on the object 120. Such bitmap images can be provided as a HAVi animation object. As the object 120 is moved along the path, the images of the animation are cycled through within the object 120.

In a further alternate embodiment, the object includes additional attributes describing its orientation. Accordingly, as the object 120 is moved along the path, it can also be rotated. This rotation information is synchronized to the legs of the path, indicating an initial rotation value and the number of rotations that the object is to go through as it travels that leg of the path.

In the manner described herein, the bitmap animation of the present invention allows a source device to communicate on-screen-display graphics data for a bitmap image to a display device. The source device also communicates a bitmap animation object structure to the display device. The display device then renders the bitmap image utilizing a local graphics buffer 71. The bitmap animation object structure is applied to the bitmap image to clip the image so that only a portion of the image within a logical intersection of the visible window and the clipping region is shown to a user. The remainder of the bitmap image is masked from view of the user. The bitmap image can then be moved in relation to the clipping region along a prescribed path to give the appearance of the image scrolling through the clipping region. The bitmap image can also be moved in relation to the visible window in order to generate changing graphics within the visible window. The clipping region can also be moved in relation to the bitmap image and the visible window along a prescribed path to give the appearance of the clipping region scrolling over the bitmap image. An object animation structure is also defined for generating an object to be displayed to the user. The object can be moved around the display along a prescribed path. Animation sequences of images can also be displayed on the object as it is displayed and moved along the prescribed path.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394–1995 serial bus structure, the present invention could also be implemented on any other appropriate bus structures, including other or later versions of the IEEE 1394 serial bus. It will also be apparent that while the preferred embodiment of the present invention uses the HAVi architecture to generate and transmit data for a bitmap image of on-screen-display graphics, any other appropriate protocol can be used to generate and transmit the graphics data, including the AV/C panel subunit.

I claim:

1. A system for generating and displaying images comprising:
   a. a source device including:
      i. a graphics source for generating on-screen-display graphics data relating to a bitmap image, clipping region and visible window; and
      ii. a source interface circuit coupled to the graphics source for transmitting the on-screen-display graphics data; and
   b. a display device including:
      i. a display interface circuit coupled to the source interface circuit for receiving the on-screen-display graphics data;
      ii. a rendering engine coupled to the display interface circuit for receiving the on-screen-display graphics data, rendering the bitmap image and applying the clipping region and the visible window to the bitmap image; and
      iii. a display coupled to the rendering engine for displaying only a first portion of the bitmap image corresponding to an intersection of the visible window and the clipping region.

2. The system as claimed in claim 1 wherein a second portion of the bitmap image outside of the intersection of the visible window and the clipping region is masked.

3. The system as claimed in claim 1 wherein the bitmap image is moved in relation to the clipping region.

4. The system as claimed in claim 1 wherein the clipping region is moved in relation to the bitmap image.

5. The system as claimed in claim 4 wherein the display interface circuit is coupled to the source interface circuit by a high speed serial interface.

6. The system as claimed in claim 5 wherein the high speed serial interface is an IEEE 1394 serial bus.

7. The system as claimed in claim 1 wherein the on-screen-display graphics data is generated according to HAVi architecture.

8. The system as claimed in claim 1 wherein the on-screen-display graphics data is generated according to AV/C panel subunit.

9. The system as claimed in claim 1 further comprising a memory buffer coupled to the rendering engine for storing the bitmap image.

* * * * *

UNITED STATES PATENT AND TRADEMARK OFFICE
CERTIFICATE OF CORRECTION

PATENT NO. : 6,377,276 B1  Page 1 of 1
DATED : April 23, 2002
INVENTOR(S) : Harold Aaron Ludtke It is certified that error appears in the above-identified patent and that said Letters Patent is hereby corrected as shown below:

<u>Title page,</u>
Item [56], References Cited,
        "U.S. PATENT DOCUMENTS", insert

| | | | |
|---|---|---|---|
| -- 5,262,965 | 11/1993 | Putnam et al. | 395/101 |
| 5,436,641 | 7/1995 | Hoang et al. | 345/197 |
| 5,736,944 | 4/1998 | Kurihara | 341/50 --. |

"OTHER DOCUMENTS", insert
-- Teener, M., "A Bus on a Diet-The Serial Alternative; An Introduction to the P1394 High Performance Serial Bus," Apple Computer, Inc., Santa Clara, Document No. XP 000340753, IEEE, pp. 316-321, 1992.
Bloks, R.H.J., "The IEEE-1394 High Speed Serial Bus," Document No. XP 000627671, Philips Journal of Research, pp. 209-216, Vol. 50, No. ½, 1996.
Meirsman, D., "AV/C Audio Control Definition; Draft Proposal For Control of Audio Functionality," Ver. 0.6, March 8, 1998.
Poynton, C., "YUV and Luminance Considered Harmful: A Plea for Precise Terminology in Video," May 2, 1998.
"HDND 1394 Interface Specifications [To Be Incorporated into OCI-C1, Consumer Device Interface Specification], working paper draft specification ver. 2.2, Cable Television Laboratories, Inc. 1998.
Azhar, S., "Draft EIA-775, DTV 1394 Interface Specification," CEMA, November 30, 1998.
"R4.1 DTV Digital Interference Standard: DRAFT EIA754," draft 0.30, CEMA/EIA R4.1 Application Working Group, April 8, 1998.
"Push v. Pull Miscellaneous Notes and TCE Opinion," Thomson Multimedia, August 20, 1998.
"OSD Bitmap Transport over the DTV 1394 Interface; Proposal to CEMA R4.8," Ver. 0.90, Mitsubishi Electric America, Inc., August 26, 1998 --.

Signed and Sealed this

Seventeenth Day of September, 2002

*Attest:*

*Attesting Officer*

JAMES E. ROGAN
*Director of the United States Patent and Trademark Office*